US012367627B2

(12) United States Patent
Yamanaka

(10) Patent No.: US 12,367,627 B2
(45) Date of Patent: Jul. 22, 2025

(54) EQUIPMENT MANAGEMENT METHOD, EQUIPMENT MANAGEMENT DEVICE, EQUIPMENT MANAGEMENT PROGRAM, AND RECORDING MEDIUM

(71) Applicant: PACIFIC CONSULTANTS CO., LTD., Tokyo (JP)

(72) Inventor: Akihiko Yamanaka, Tokyo (JP)

(73) Assignee: PACIFIC CONSULTANTS CO., LTD., Tokyo (JP)

(*) Notice: Subject to any disclaimer, the term of this patent is extended or adjusted under 35 U.S.C. 154(b) by 158 days.

(21) Appl. No.: 18/023,093

(22) PCT Filed: Aug. 5, 2021

(86) PCT No.: PCT/JP2021/029101
§ 371 (c)(1),
(2) Date: Feb. 24, 2023

(87) PCT Pub. No.: WO2022/044755
PCT Pub. Date: Mar. 3, 2022

(65) Prior Publication Data
US 2023/0298241 A1 Sep. 21, 2023

(30) Foreign Application Priority Data
Aug. 27, 2020 (JP) ................. 2020-143468

(51) Int. Cl.
G06T 13/20 (2011.01)
G06Q 10/20 (2023.01)
(Continued)

(52) U.S. Cl.
CPC ............ G06T 13/20 (2013.01); G06Q 10/20 (2013.01); G06T 15/20 (2013.01); G06T 19/006 (2013.01);
(Continued)

(58) Field of Classification Search
CPC ....... G06T 13/20; G06T 15/20; G06T 19/006; G06T 19/20; G06T 2200/24;
(Continued)

(56) References Cited

U.S. PATENT DOCUMENTS 10,210,669 B1* 2/2019 Cox .................. G06F 30/20
2010/0316280 A1* 12/2010 Lancaster ............ G06V 20/653
382/154

(Continued)

FOREIGN PATENT DOCUMENTS

CN 109508579 3/2019
JP 2002-279449 A 9/2002
(Continued)

OTHER PUBLICATIONS

International Search Report issued in International Patent Application No. PCT/JP2021/029101, issued Aug. 31, 2021, with English translation.

(Continued)

Primary Examiner — Yu Chen
(74) Attorney, Agent, or Firm — GREENBLUM & BERNSTEIN, P.L.C.

(57) ABSTRACT

To provide a system that can obtain moving images for equipment maintenance and management using point cloud data, with an inexpensive configuration. A program according to the present invention makes a processor of a computer execute steps including: a first step of receiving input of point cloud data that is acquired by measuring a space including a management object with a three-dimensional point cloud scanner; a second step of selecting a plurality of pieces of point data, which are part of the point cloud data that is acquired, so as to determine point cloud data to be animated; and a third step of animating the point cloud data, which is composed of the plurality of pieces of point data (Continued)

that are selected in the second step, so as to generate a management moving image in which the management object is represented as three-dimensional data in a virtual space.

20 Claims, 10 Drawing Sheets

(51) Int. Cl.
*G06T 15/20* (2011.01)
*G06T 19/00* (2011.01)
*G06T 19/20* (2011.01)

(52) U.S. Cl.
CPC .......... *G06T 19/20* (2013.01); *G06T 2200/24* (2013.01); *G06T 2210/56* (2013.01); *G06T 2219/004* (2013.01); *G06T 2219/2004* (2013.01)

(58) Field of Classification Search
CPC ........... G06T 2210/56; G06T 2219/004; G06T 2219/2004; G06Q 10/20
See application file for complete search history.

(56) References Cited

U.S. PATENT DOCUMENTS

| | | | |
|---|---|---|---|
| 2012/0246166 A1* | 9/2012 | Krishnaswamy | G06F 16/29 707/741 |
| 2013/0278631 A1* | 10/2013 | Border | G06F 3/04842 345/633 |
| 2014/0267723 A1* | 9/2014 | Davidson, Jr. | G06T 19/006 345/632 |
| 2016/0187654 A1* | 6/2016 | Border | G02B 27/0172 359/630 |
| 2016/0364917 A1* | 12/2016 | Zhang | G06T 17/00 |
| 2018/0240281 A1* | 8/2018 | Vincelette | G06T 15/20 |
| 2019/0213755 A1* | 7/2019 | Bassa | G06F 18/24133 |
| 2020/0160601 A1* | 5/2020 | Shreve | G06F 30/00 |
| 2020/0202578 A1* | 6/2020 | Ebert | G02B 27/017 |
| 2020/0348662 A1* | 11/2020 | Cella | G05B 19/41865 |
| 2020/0379467 A1* | 12/2020 | Schwiesow | G01S 7/4808 |
| 2020/0394844 A1* | 12/2020 | Koshiba | G06F 3/011 |
| 2021/0089040 A1* | 3/2021 | Ebrahimi Afrouzi | G05D 1/0248 |
| 2021/0097768 A1* | 4/2021 | Malia | G06F 3/04845 |
| 2022/0027654 A1* | 1/2022 | Iwami | G06V 20/00 |
| 2022/0139094 A1* | 5/2022 | Yoshimi | G06T 7/174 382/173 |
| 2022/0366673 A1* | 11/2022 | Iwami | G06V 20/647 |
| 2023/0011921 A1* | 1/2023 | Iwami | G06V 10/82 |
| 2023/0281350 A1* | 9/2023 | O'Keeffe | G06F 30/13 703/1 |
| 2023/0298241 A1* | 9/2023 | Yamanaka | G06Q 10/20 345/419 |

FOREIGN PATENT DOCUMENTS

| | | |
|---|---|---|
| JP | 2015-158772 A | 9/2015 |
| JP | 2017-054468 A | 3/2017 |
| JP | 2018-106309 A | 7/2018 |
| JP | 2019-148946 A | 9/2019 |
| WO | WO 2017/163384 A1 | 9/2017 |

OTHER PUBLICATIONS

Office Action dated Jun. 17, 2025 issued in Chinese Patent Application No. 202180052736.1 along with an English translation.

\* cited by examiner

| DATA ID | X COORDINATE | Y COORDINATE | Z COORDINATE |
|---|---|---|---|
| P1 | X1 | Y1 | Z1 |
| P2 | X2 | Y2 | Z2 |
| P3 | X3 | Y3 | Z3 |
| P4 | X4 | Y4 | Z4 |
| P5 | X5 | Y5 | Z5 |
| P6 | X6 | Y6 | Z6 |
| ⋮ | ⋮ | ⋮ | ⋮ |
| P20000 | X20000 | Y20000 | Z20000 |

| | |
|---|---|
| FACILITY ID | 37 |
| FACILITY NAME | MAIN SEWAGE PUMP DISCHARGE VALVE No. 6 |
| EQUIPMENT GROUP NUMBER | |
| RENEWAL SOURCE FACILITY ID | |
| PLANT NAME | ○○ PURIFICATION CENTER |
| BUILDING NAME | SEDIMENTATION BASIN BUILDING |
| FLOOR NAME | 1F |
| ROOM NAME | ELECTRIC MOTOR ROOM |
| EQUIPMENT NAME | MAIN PUMP EQUIPMENT |
| FACILITY TYPE NAME | MACHINE EQUIPMENT |
| MAJOR CLASSIFICATION NAME | PUMP EQUIPMENT |
| MIDDLE CLASSIFICATION NAME | SEWAGE PUMP EQUIPMENT |
| MINOR CLASSIFICATION NAME | DISCHARGE VALVE |
| STATE NAME | IN OPERATION |
| DATE OF DISPOSAL | |
| NUMBER OF OPERATIONS | |
| NUMBER OF GUARANTEED OPERATIONS | |
| MANUFACTURING COMPANY | ○○ INDUSTRY CO., LTD. |
| TYPE | ROUND EXTERNAL THREADED GATE VALVE |
| MODEL NUMBER | MSV-00 |
| SERIAL NUMBER | 77B-310 |
| YEAR OF MANUFACTURE | S53 |
| MONTH OF MANUFACTURE | 2 |
| BOARD NUMBER | LCB-PE60 |
| INSTALLATION YEAR | 1978 |
| STANDARD DURABLE YEARS | 20 |

FIG. 8

EQUIPMENT MANAGEMENT METHOD, EQUIPMENT MANAGEMENT DEVICE, EQUIPMENT MANAGEMENT PROGRAM, AND RECORDING MEDIUM

TECHNICAL FIELD

The present disclosure relates to an equipment management method, an equipment management device, an equipment management program, and a recording medium.

BACKGROUND ART

Conventionally, systems using point cloud data which is acquired by a three-dimensional point cloud scanner have been known in the fields of BIM/CIM, where point cloud data is converted into three-dimensional models for the purpose of designing structures, MMS which aims to measure aging deterioration, and the like. As such a system, Patent Literature 1 discloses a system that enables workers to intuitively grasp progress states of work sites by imaging data obtained by converting point cloud data into three-dimensional models, in the field of architecture and civil engineering.

PRIOR ART LITERATURE

Patent Literature

Patent Literature 1: Japanese Patent Application Laid Open No. 2019-148946

SUMMARY OF THE INVENTION

Problems to be Solved by the Invention

However, if point cloud data is employed for maintenance and management of the entire facility, the data volume becomes enormous. Therefore, a three-dimensionally modeling work requires an enormous amount of man-hours and thus enormous costs. As a result, it has been difficult to introduce such a management system using point cloud data for management of facilities that are not expected to generate high revenues, such as existing infrastructure facilities.

An object of the present invention is to provide a system that can obtain moving images for equipment maintenance and management using point cloud data, with an inexpensive configuration.

Means to Solve the Problems

A program according to the present invention makes a processor of a computer execute steps including: a first step of receiving input of point cloud data that is acquired by measuring a space including a management object with a three-dimensional point cloud scanner; a second step of selecting a plurality of pieces of point data, which are part of the point cloud data that is acquired, so as to determine point cloud data to be animated; and a third step of animating the point cloud data, which is composed of the plurality of pieces of point data that are selected in the second step, so as to generate a management moving image in which the management object is represented as three-dimensional data in a virtual space.

Effects of the Invention

According to the present invention, moving images for equipment maintenance and management using point cloud data can be obtained with an inexpensive configuration.

BRIEF DESCRIPTION OF THE DRAWINGS

FIG. 8 is a diagram illustrating an example of a management ledger associated with nameplate data illustrated in FIG. 7.

DETAILED DESCRIPTION OF THE EMBODIMENTS

Embodiment

Figure 1:
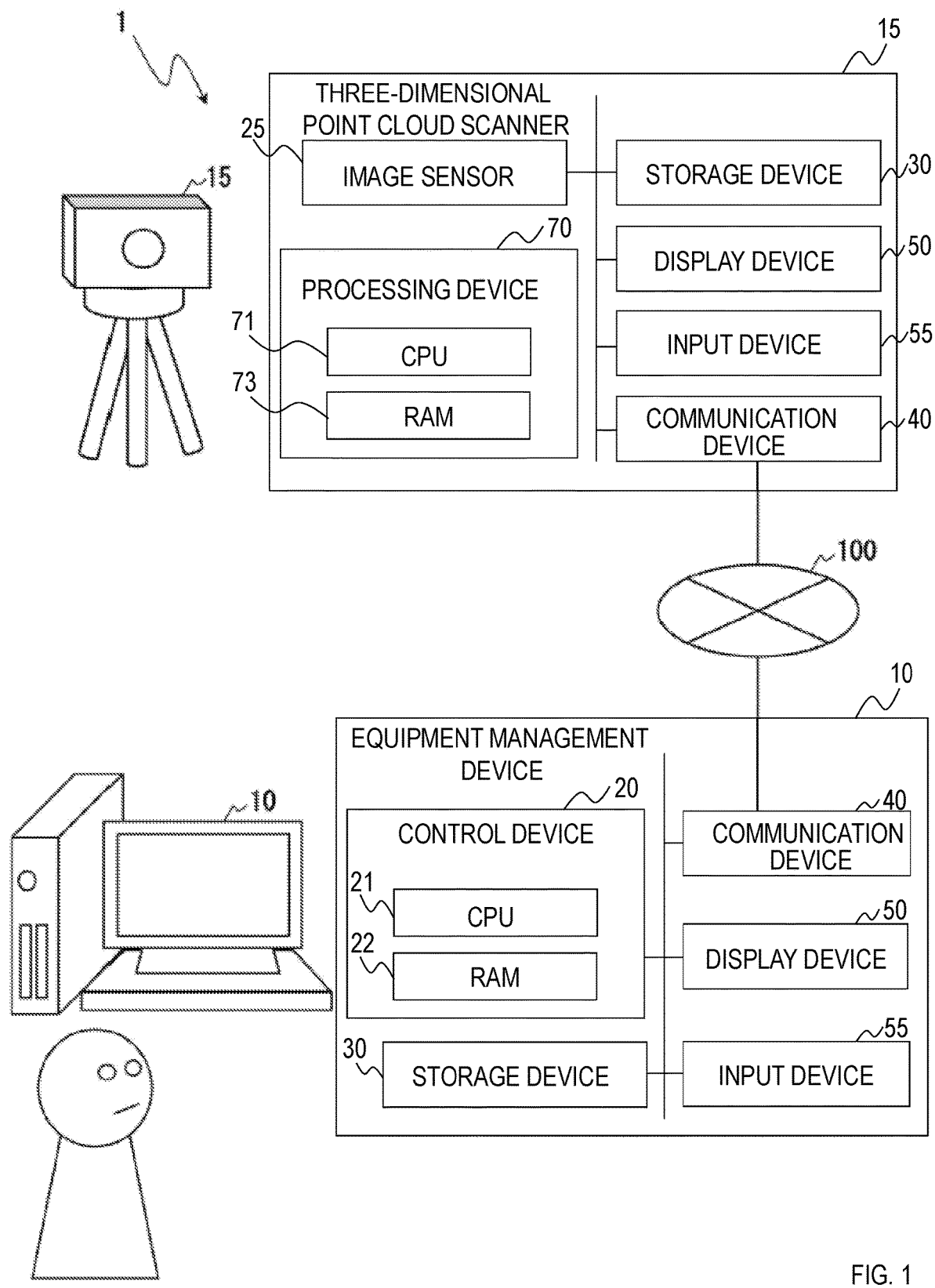
FIG. 1 is a block diagram illustrating a configuration of a system according to the present invention.

An embodiment according to the present invention will be described in detail below with reference to the accompanying drawings.

In the drawings for describing the embodiment, the same components will be, in principle, denoted by the same reference characters and repeated description thereof will be omitted.

<General Overview>

The present invention is an equipment management system 1 (hereinafter, referred to as the system 1) that links equipment information to a moving image which is generated from point cloud data acquired by a three-dimensional point cloud scanner 15 (see FIG. 1) without converting the point cloud data into a three-dimensional model so as to provide a moving image which is to be used for maintenance and management of the corresponding equipment. In addition, on the use of point cloud data, the system 1 significantly reduces processing costs required for three-dimensional modeling of point cloud data by the function of enhancing rendering speed of point cloud data without reducing data volume. Further, the system 1 attaches nameplate data 90 (see FIG. 6), with which individual management objects are identified, to equipment in a moving image so as to facilitate retrieval of equipment information. FIG. 1 is a block diagram illustrating a configuration of the system 1.

As illustrated in FIG. 1, the system 1 includes an equipment management device 10 and the three-dimensional point cloud scanner 15. Here, a plurality of equipment management devices 10 and a plurality of three-dimensional point cloud scanners 15 may be provided. The equipment management device 10 and the three-dimensional point cloud scanner 15 are configured to be able to communicate with each other via a wide area network 100.

The equipment management device 10 is a terminal or the like used by users. The users are workers who are in charge of maintenance and inspection work on management objects and supervisors who supervise the work conditions. The equipment management device 10 acquires point cloud data captured by the three-dimensional point cloud scanner 15, performs various types of processing described later, and then displays a management moving image composed of the point cloud data to users. Here, point cloud data is composed of a set of pieces of point data whose positions are described by coordinate information.

Examples of the equipment management device 10 include electronic devices such as personal computers, tablets, and smartphones. A typical equipment management device 10 includes a control device 20, a storage device 30, a communication device 40, a display device 50, and an input device 55.

The control device 20 includes a CPU 21 and a RAM 22 and centrally controls the equipment management device 10. The CPU 21 is a processor that executes processing in accordance with a computer program stored in the storage device 30. The RAM 22 is used as a working memory when the CPU 21 executes processing. Hereinafter, the processing executed by the CPU 21 will be described as the processing executed by the control device 20.

The storage device 30 stores various computer programs and data. The storage device 30 is composed of, for example, a flash memory or a hard disk device. In the equipment management device 10, application programs according to the present invention, including animation software for rendering point cloud data, are installed and stored in the storage device 30. Point cloud data acquired from the three-dimensional point cloud scanner 15 is also stored in the storage device 30.

The control device 20 executes processing in accordance with the application program so as to perform later-described various types of processing to the point cloud data acquired from the three-dimensional point cloud scanner 15 and display the result of the processing on the display device 50.

The communication device 40 is configured to be able to communicate with devices connected with the wide area network 100. The display device 50 is composed of, for example, a liquid-crystal display or an organic EL display. The display device 50 is controlled by the control device 20, displaying various screens to users. Various screens include a later-described management moving image generated from point cloud data.

The input device 55 is configured to receive an input operation from a user and input a corresponding operation signal into the control device 20. The input device 55 may be, for example, a keyboard or a touch panel which is integrally configured with the display device 50. The input device 55 receives a touch operation or write operation with respect to a screen displayed on the display device 50 and inputs the corresponding operation signal into the control device 20.

The three-dimensional point cloud scanner 15 includes an image sensor 25, a processing device 70, a storage device 30, a display device 50, an input device 55, and a communication device 40. The image sensor 25 scans a management object, which is an object to be captured, with a slit laser beam and receives reflected light to obtain distance information from the object based on the principle of triangulation, thereby acquiring the three-dimensional shape of the management object.

The processing device 70 includes a CPU 71 and a RAM 73. The CPU 71 is a processor that executes processing in accordance with a computer program stored in the storage device 30. The RAM 73 is used as a working memory when the CPU 71 executes processing.

The communication device 40 is configured to be able to communicate with the equipment management device 10 via the wide area network 100. When an application program is started, the processing device 70 operates the image sensor 25 so as to acquire point cloud data of an object. Further, the processing device 70 transmits the acquired point cloud data to the equipment management device 10 in accordance with an instruction from the equipment management device 10.

Figures 2, 3:
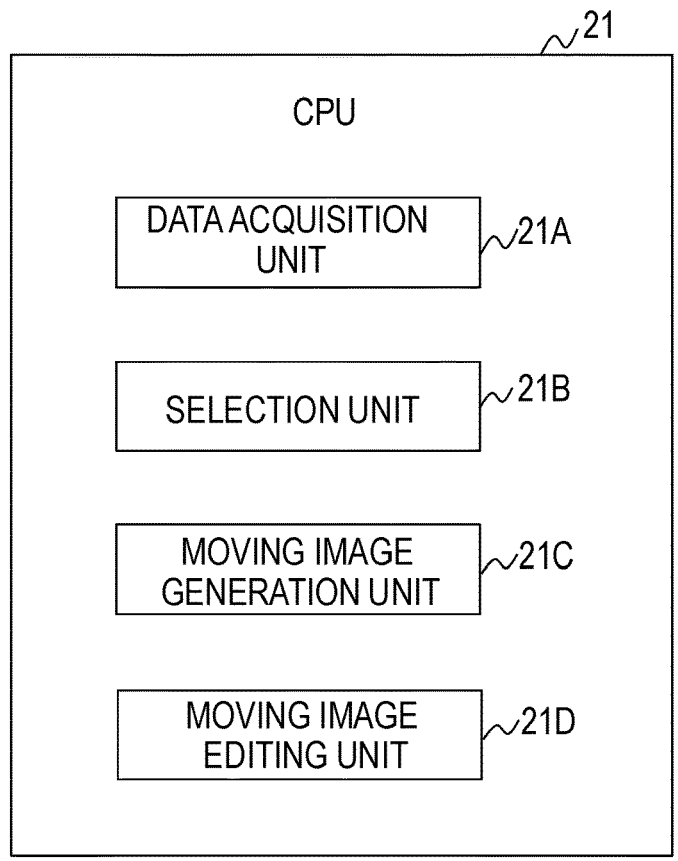
FIG. 2 is a diagram illustrating an example of point cloud data acquired by a scanner illustrated in FIG. 1.
FIG. 3 is a block diagram illustrating a functional configuration of a CPU in a control device illustrated in FIG. 1.

Point cloud data acquired by the three-dimensional point cloud scanner 15 through measurement will now be described. FIG. 2 is a diagram illustrating an example of point cloud data acquired by the scanner illustrated in FIG. 1. As illustrated in FIG. 2, point data constituting point cloud data includes coordinate information corresponding to a data ID for each plot. Point cloud data is a set of such data IDs and coordinate information.

The function of the CPU 21 in the control device 20 will now be described. FIG. 3 is a block diagram illustrating a functional configuration of the CPU 21 in the control device 20 illustrated in FIG. 1. As illustrated in FIG. 3, the CPU 21 includes a data acquisition unit 21A, a selection unit 21B, a moving image generation unit 21C, and a moving image editing unit 21D. The data acquisition unit 21A executes an installed application program so as to acquire point cloud data obtained by measuring a space including a management object with the three-dimensional point cloud scanner 15.

The selection unit 21B selects a plurality of pieces of point data which are part of the acquired point cloud data and determines point cloud data which is to be animated by using animation software. Here, "point cloud data which is to be animated" is part of point cloud data acquired from the three-dimensional point cloud scanner 15 by the data acquisition unit 21A, being point cloud data which is to be animated as a management moving image. The moving image generation unit 21C animates point cloud data composed of the selected point data with the use of the animation software, thereby generating a management moving image in which a management object is three-dimensionally rendered in a virtual space.

Figure 4:
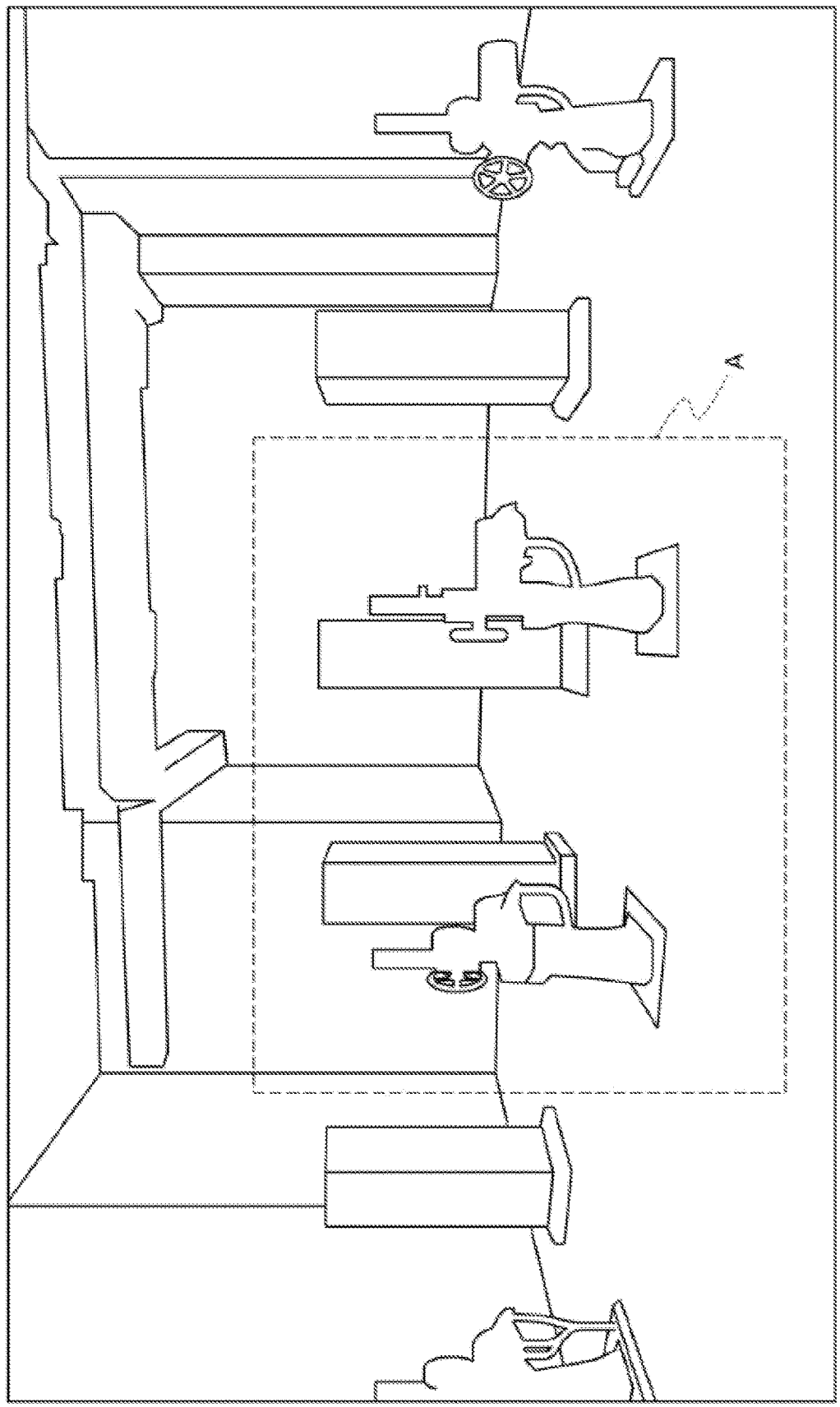
FIG. 4 is a diagram illustrating an example of a management moving image generated by the system according to the present invention.
Figure 5:
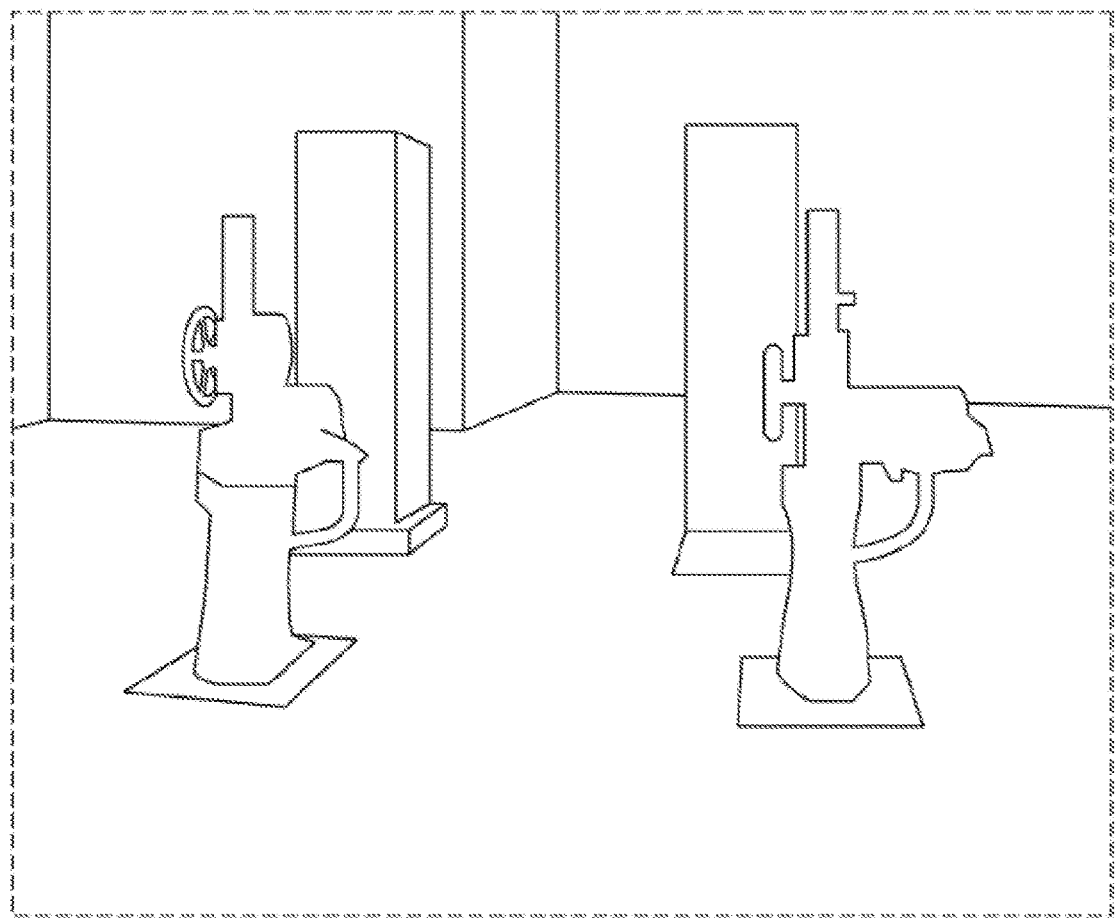
FIG. 5 is an enlarged view of an A portion in the management moving image illustrated in FIG. 4.

FIG. 4 is a diagram illustrating an example of a management moving image generated by the system. FIG. 5 is an enlarged view of an A portion in the management moving image illustrated in FIG. 4. As illustrated in FIGS. 4 and 5, a shape of a management object is represented by a myriad of pieces of point data in a management moving image. In FIGS. 4 and 5, sewage equipment which is existing infrastructure equipment is rendered as a management object.

In the management moving image shown in FIGS. 4 and 5, the viewpoint with respect to the management object can be freely changed. That is, by changing the viewpoint so that the viewpoint moves forward, backward, left and right, or up and down in a virtual space shown in the management moving image, the appearance of the management moving image is changed. The viewpoint in a management moving image can also be moved as a 360° horizontal rotation or a 360° vertical rotation. Further, a management moving image can be freely increased or reduced in size based on a certain viewpoint. By viewing a management moving image, the current shape of a management object can be checked. In a management moving image, an image (still image) of point cloud data thus changes over time in response to a viewpoint moving operation performed by a user. Therefore, a management moving image may be displayed as an image (still image) when the viewpoint moving operation is not performed.

A method for selecting point cloud data by the selection unit 21B will now be described. The selection unit 21B executes processing for selecting part of point cloud data by defining a positional interval between mutually-adjacent pieces of point data in the point cloud data based on an input value from a user. Here, the selection unit 21B does not need to delete a plurality of pieces of point data constituting point cloud data or newly save point cloud data after deletion. In the processing for selecting part of point cloud data, it is enough to perform only processing for selecting point data used for rendering in post processing. For example, when a positional interval between mutually-adjacent pieces of point data is 1 mm pitch, about half of pieces of point data can be selected by defining the positional interval to 2 mm pitch. Thus, the work for selecting point data can be easily performed by uniformly selecting point data in accordance with a positional interval of point data inputted by a user.

Alternatively, the selection unit 21B may execute the processing for selecting part of point cloud data by coarsening point cloud data located outside a predetermined range from a viewpoint of a management moving image. In this case, for example, in a virtual space shown in a management moving image, 2 mm-pitch selection may be performed with respect to point cloud data located inside a space with a radius of 10 m toward the front from a viewpoint and 4 mm-pitch selection may be performed with respect to point cloud data located outside the space with the radius of 10 m toward the front from the viewpoint. Accordingly, denser point cloud data can be obtained in a range near the viewpoint in the management moving image, making it easier to identify three-dimensional shapes located near the viewpoint.

Further, the selection unit 21B may execute the processing for selecting part of point cloud data so that the point cloud data has preset density in a process of changing a viewpoint of a management moving image. For example, setting is performed so that point cloud data has a 4 mm pitch while a viewpoint is moved and point cloud data has a 2 mm pitch while the viewpoint is stationary. Accordingly, in the work for checking a three-dimensional shape of a management object, point cloud data is coarse at timing when a point to be checked is searched by moving a viewpoint, being able to raise a speed of rendering point cloud data by animation software. On the other hand, at timing when the viewpoint is fixed and the management moving image is viewed, point cloud data is dense and a detailed shape can be checked. Here, in terms of the above-mentioned method for selecting point data, a plurality of methods may be performed at the same time or in order.

Further, when a positional interval between mutually-adjacent pieces of point data is increased to coarsen distribution density of point data in point cloud data as mentioned above, the size of point data may be increased. For example, when an interval between pieces of point data is changed from 1 mm to 2 mm, a diameter of the point data can be doubled in proportion to the changing ratio of the interval. Accordingly, even when the distribution density of point data becomes coarse, widening of a gap between pieces of point data can be suppressed and visibility of the entire point cloud data can be thereby ensured. Here, a changing rate of the size of point data may be different from the changing rate of a positional interval between pieces of point data.

The moving image editing unit 21D executes processing for linking the nameplate data 90 to a management object shown in a management moving image. Here, the nameplate data 90 is data indicating a display board that has a shape of a plate, on which part of attribute information of a corresponding management object is described, and is displayed in a virtual space shown by a management moving image. It is sufficient, however, that the nameplate data 90 is provided with at least information or a mark with which a corresponding management object can be identified. This is because users can check management data linked to the nameplate data 90. Users operate and arrange a position of the nameplate data 90 so that the position of the equipment, which is a management object, overlaps with that of the nameplate data 90 on the screen, thereby linking the equipment to the nameplate data 90 in the management moving image. "Linking" means associating with each other.

Figure 6:
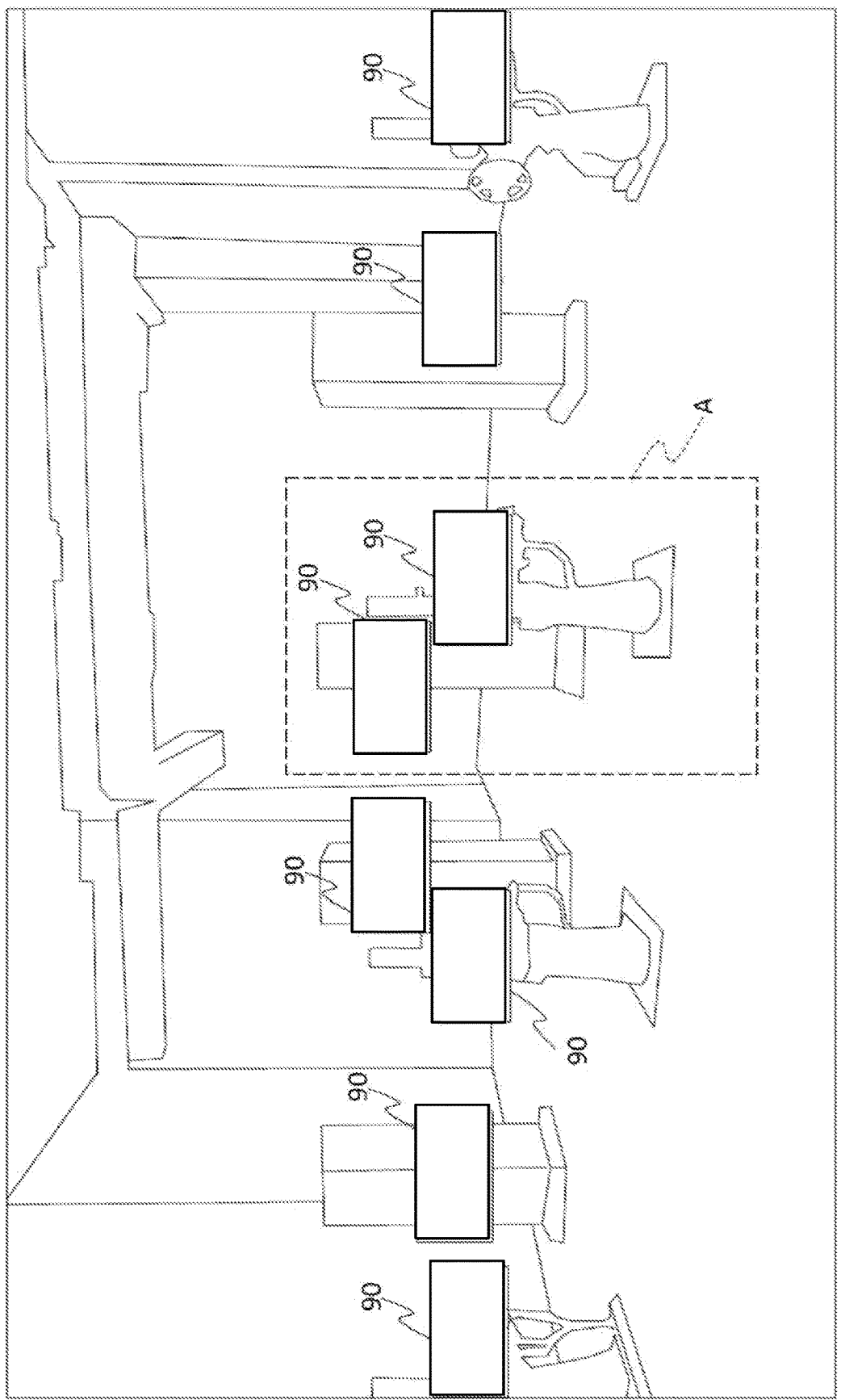
FIG. 6 is a diagram illustrating a state in which nameplate data is attached to the management moving image illustrated in FIG. 4.
Figure 7:
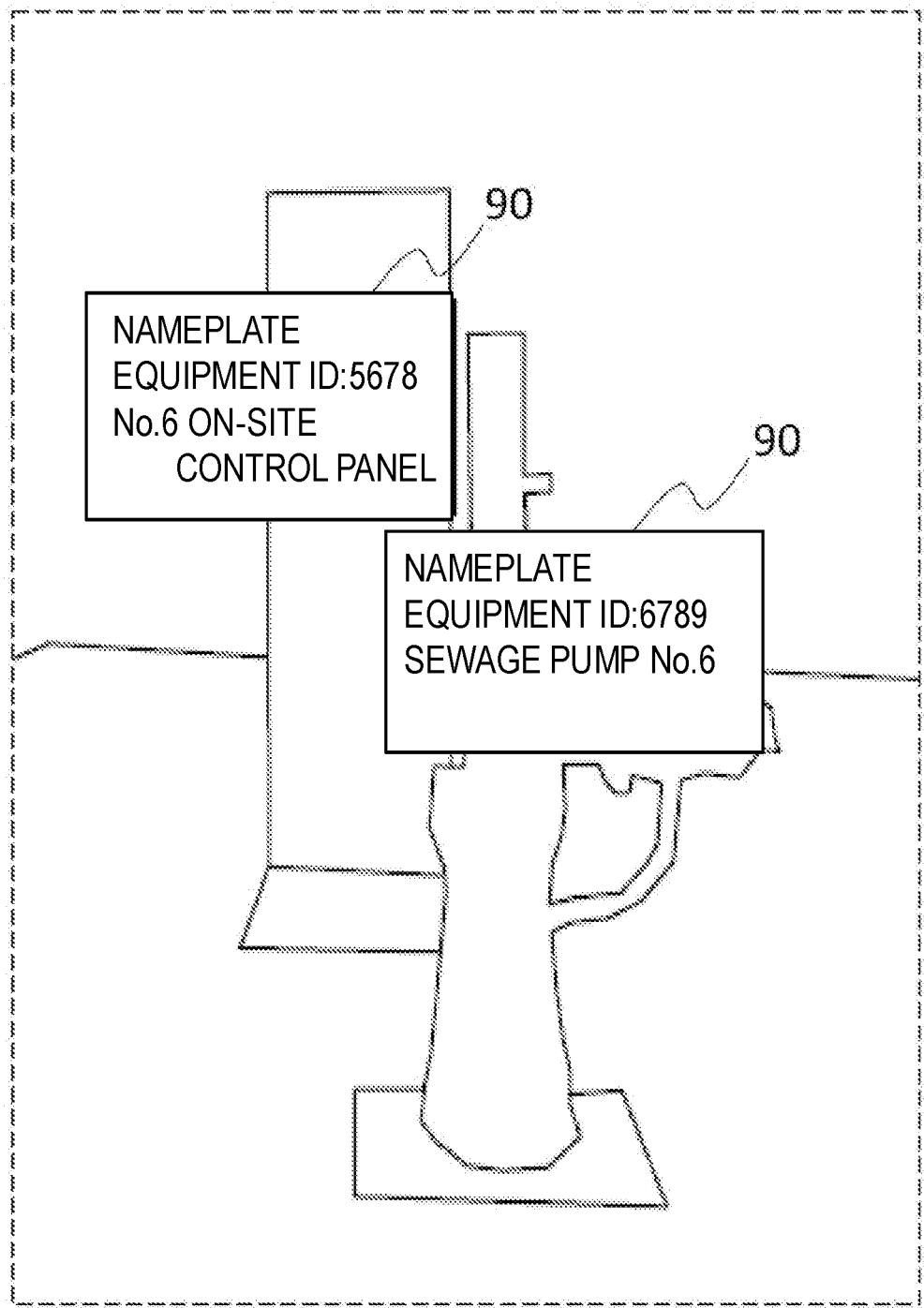
FIG. 7 is an enlarged view of an A portion in the management moving image illustrated in FIG. 6.

FIG. 6 is a diagram illustrating a state in which the nameplate data 90 is attached to the management moving image illustrated in FIG. 4. FIG. 7 is an enlarged view of an A portion in the management moving image illustrated in FIG. 6. As illustrated in FIGS. 6 and 7, the nameplate data 90 is attached to each equipment which requires its maintenance and inspection, such as a pump and a switchboard, in a facility rendered in a management moving image. The name of the nameplate data 90 can be displayed in a list on the left edge of the screen. FIG. 6 omits name listing display, but FIG. 7 shows an example of the name listing display. When a list-displayed name of the nameplate data 90 is selected, corresponding equipment on a management moving image is displayed in an enlarged manner.

The position of the nameplate data 90 is set on the basis of point data constituting equipment. That is, the nameplate data 90 is fixed on a coordinate position, which is indicated by coordinate information included in corresponding point data, in a virtual space. Specifically, when the nameplate data 90 is newly registered in a management moving image, a user selects and clicks point data constituting equipment. Coordinate information of point data, which is located at the closest position from the viewpoint of the management moving image at the time of the clicking, is the coordinate information of the nameplate data 90. Then, the orientation of the nameplate data 90 is set so that the nameplate data 90 faces in the direction from the corresponding point data toward the viewpoint.

Management data to be used for management of a management object is linked to the nameplate data 90. FIG. 8 is a diagram illustrating a management ledger which is an example of management data linked with the nameplate data 90. As illustrated in FIG. 8, each attribute of equipment is described in the management ledger. By checking the management ledger, details of the corresponding management object can be checked. Contents of a management ledger can be viewed by selecting the nameplate data 90 on a management moving image or a list-displayed name of the nameplate data 90.

The nameplate data 90 and the management ledger are bi-directionally searchable. That is, the nameplate data 90 of a management moving image can be accessed from a URL or the like described in data of a management ledger. Through this access to view the management moving image to which the nameplate data 90 is attached, information about where and under what conditions equipment described in the management ledger is used can be checked.

The moving image editing unit 21D executes processing for adjusting a display form of the nameplate data 90. The display form of the nameplate data 90 includes at least one of the display position, size, and color of the nameplate data 90. For example, by selecting the nameplate data 90 that a user wants to check, the contents of the nameplate data 90 can be enlarged and displayed. This makes it easy to check information described in the nameplate data 90 or a management ledger linked with the nameplate data 90. Further, a user may move a position, on which the nameplate data 90 is displayed, to make it easier to check the shape of the background of the nameplate data 90.

In addition, the moving image editing unit 21D may change the color of the nameplate data 90. For example, the moving image editing unit 21D may refer to a management ledger linked with corresponding nameplate data 90 and automatically change the color of the nameplate data 90, which corresponds to equipment being a management object whose inspection time is approaching, into a color different from the color of other nameplate data 90. Further, the moving image editing unit 21D may change the color of nameplate data 90, which corresponds to equipment being a management object whose inspection work is finished, into a color different from the color of other nameplate data 90, through input of a person in charge of the inspection work. Such color change of the nameplate data 90 enables users to immediately recognize which equipment should be noted during a maintenance and inspection work.

Management data linked with the nameplate data 90 does not have to be a management ledger. For example, data captured by a web camera, which captures a condition of a management object in real time, can be linked to nameplate data 90 as management data. Accordingly, it is possible to view a moving image of the real-time condition of corresponding management object captured by a web camera by, for example, clicking on the URL linked to the nameplate data 90.

Further, management data linked to the nameplate data 90 may be information to be used for management. For example, a manual moving image can be linked to the nameplate data 90 as management data. The manual moving image is obtained by capturing work contents of a maintenance and inspection work performed with respect to a management object and providing the explanation of the work contents. In this case, the manual moving image can be viewed by clicking on the URL linked to the nameplate data 90.

Figure 9:
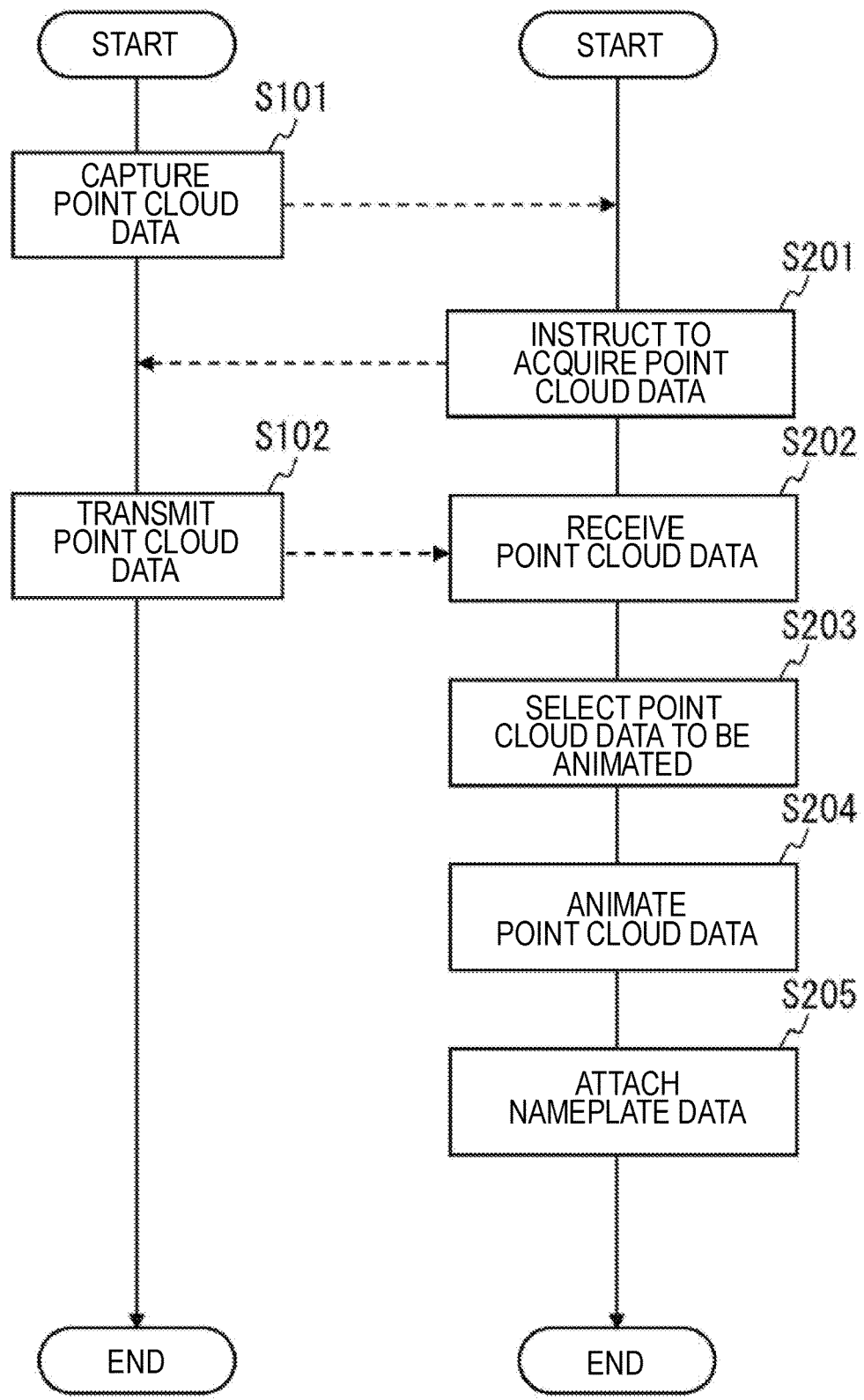
FIG. 9 is a diagram for explaining processing of the system according to the present invention.

The processing of the system 1 will now be described with reference to FIG. 9. FIG. 9 is a diagram for explaining processing of the system 1. The three-dimensional point cloud scanner 15 first captures point cloud data (step S101). At this time, the three-dimensional point cloud scanner 15 acquires point cloud data in which three-dimensional data of a management object is described by three-dimensional coordinates.

After step S101, the control device 20 instructs the three-dimensional point cloud scanner 15 to acquire the point cloud data (step S201). After step S201, the three-dimensional point cloud scanner 15 transmits the point cloud data to the equipment management device 10 (step S102).

After step S102, the data acquisition unit 21A receives the point cloud data transmitted from the three-dimensional point cloud scanner 15 (step S202). After step S202, the selection unit 21B selects a plurality of pieces of point data, which are to be animated, in the acquired point cloud data and determines point cloud data which is to be animated, in accordance with user's inspection (step S203).

After step S203, the moving image generation unit 21C executes animation software to generate a management moving image from the point cloud data (step S204). Thus, a management moving image in which a management object is rendered by point cloud is generated.

The moving image editing unit 21D executes processing for attaching the nameplate data 90 (step S205). This processing is performed in a manner such that a user matches the position of the nameplate data 90 with the position of a management object indicated by this nameplate data 90 on a management moving image. The maintenance and inspection work of the management object is performed by workers by checking a condition of the management object or checking attributes of the management object while viewing the management moving image, which is generated through the above-described processing, in the maintenance and inspection work of the management object.

According to the system 1, a management moving image is generated by selecting part of pieces of point data without creating a three-dimensional model from point cloud data, which is different from conventional systems, as described above. Therefore, a three-dimensionally modeling work, which requires large cost, can be omitted and moving images for equipment maintenance and management using point cloud data can be obtained with an extremely inexpensive configuration. Accordingly, management moving images using point cloud data can be employed for maintenance and management of management objects in existing infrastructure facilities that are not expected to generate high revenues.

In a field work of maintenance and inspection, it is necessary to use a general-purpose portable personal computer because of the need to go to the site for inspection and from the viewpoint of reducing maintenance and management costs. However, the data volume of point cloud data is large and it has been accordingly difficult to smoothly perform image processing of point cloud data with general-purpose personal computers. On the other hand, the system 1 selects and displays part of acquired point cloud data, thereby being able to reduce a load on processing required for conversion to moving images. As a result, image processing of point cloud data can be smoothly performed even when using a general-purpose personal computer which does not have high processing power.

When point cloud data is converted into a three-dimensional model, the three-dimensional model is represented to have an approximate shape that deviates from the actual structure. Thus, there has been room for improvement in realistically representing a condition of a management object. For this situation, the system 1 directly uses point cloud data without converting the point cloud data into a three-dimensional model, being able to suppress maintenance and management costs and realistically represent a condition of a management object in line with the real condition of the management object.

In addition, with the recent aging of the population and declining birthrate, there has been a demand for smooth instruction using moving images to pass on the maintenance and management know-how of skilled engineers to those who are less experienced. For this demand, the system 1 can store, for example, a manual moving image of a maintenance and management work in a manner that the manual moving image is linked to a management moving image rendered with point cloud data. Thus, the use of moving images allows for smooth instruction, making it easier to pass on skilled engineers' maintenance and management know-how to those who are less experienced.

There has conventionally been a need to reduce man-hours for on-site work. Recently, with the increasing digitization of maintenance and management work and the like, there has been a demand to ensure that work can be performed as much as possible even in situations where the physical movement of people is difficult due to an occurrence of an emergency such as pandemic. For this situation, a checking work and the like associated with maintenance and management can be performed by using moving images, being able to reduce man-hours for on-site work in the present invention. Maintenance and management can be thus made efficient. In addition, work comes to be able to be performed as much as possible even in situations where the physical movement of people is difficult due to an occurrence of an emergency such as pandemic.

Since the processing for selecting point data to be rendered is performed without deleting part of pieces of point data constituting point cloud data, there is no need for newly saving point cloud data after deleting part of pieces of point data and processing load can be reduced.

Further, the nameplate data 90 is linked to a management object on a management moving image and attributes of equipment which is the management object are thereby rendered in the management moving image, making it easy to check a condition and the like of the equipment.

Since management data to be used for management of a management object is linked to the nameplate data 90, various types of management data can be linked to a nameplate and used for the maintenance and inspection work.

When a management object is existing sewage equipment, three-dimensional shapes of complex shaped structures such as pumps and pipes can be easily rendered by using point cloud data.

<Modification>

Figure 10:
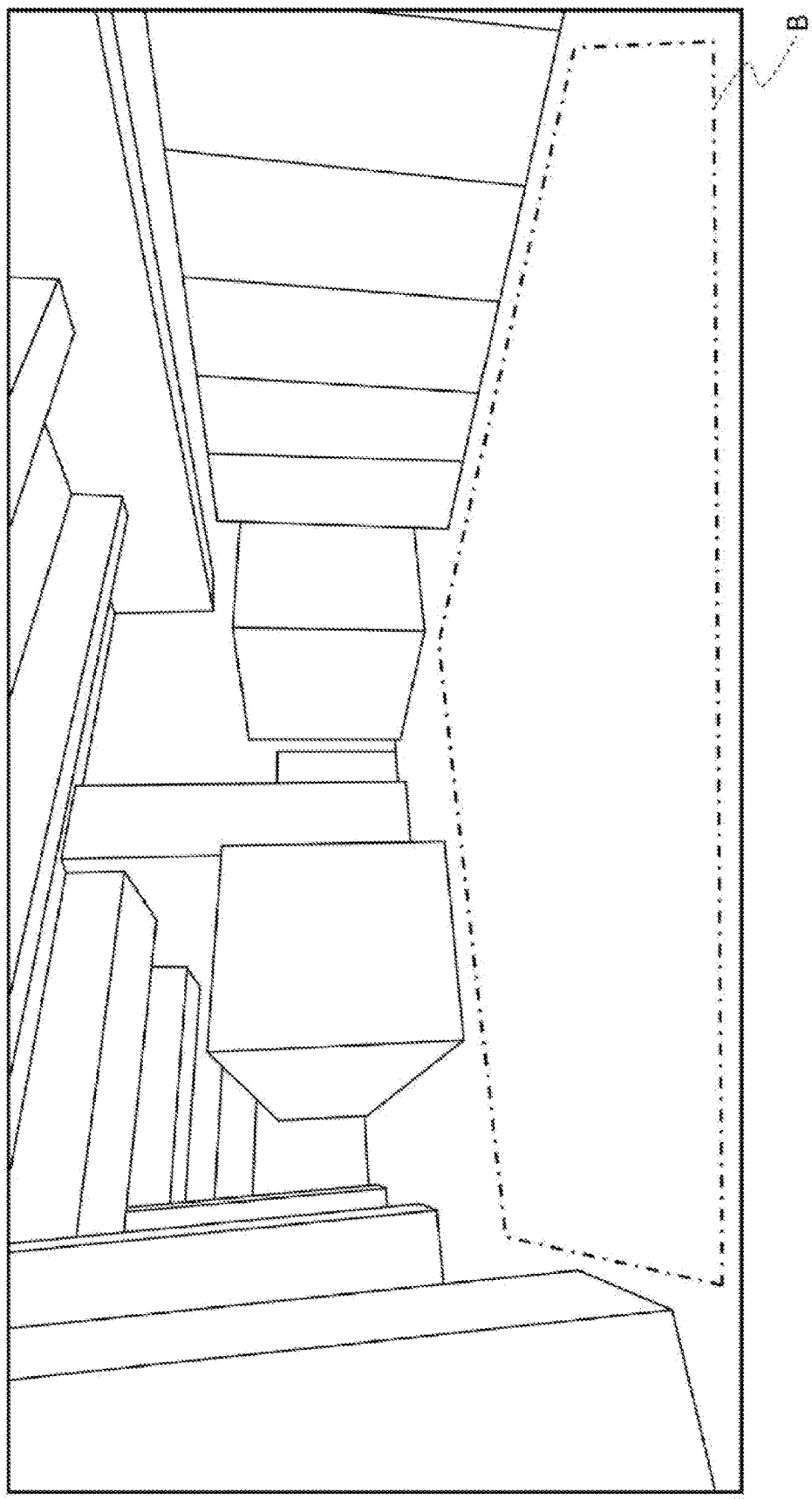
FIG. 10 is a diagram illustrating an example of a management moving image generated by a modification of the system according to the present invention.

A modification of the present invention will now be described with reference to FIG. 10. FIG. 10 is a diagram illustrating an example of a management moving image generated by the modification of the system 1. In this modification, in acquired point cloud data, structures having simple shapes are converted into three-dimensional models among structures captured with a management object and point data in a portion converted into the three-dimensional models is excluded from candidates of point cloud data to be animated. Then, processing is executed in which a plurality of pieces of point data are partially selected from pieces of point data other than the point data in the portion converted into the three-dimensional models so as to determine point cloud data to be animated. Here, "structures having simple shapes" mean structures that can be rendered by predetermined polygons, such as floors, walls, and pillars. Conditions may be predefined for "simple shapes".

B portion in FIG. 10 denotes a floor of a facility which is a management object. The three-dimensional shape of this floor does not need to be accurately rendered with point cloud. A user specifies a partial region of the floor to perform processing for converting the floor into a three-dimensional model. Then, the point cloud data of the portion converted into the three-dimensional model is excluded from candidates of point cloud data to be animated. Subsequently, a plurality of pieces of point data other than the pieces of point data which are converted into the three-dimensional model are selected so as to determine point cloud data to be animated. The point cloud data composed of a plurality of pieces of point data constituting the floor is thus replaced with a single three-dimensional model. This can significantly reduce the number of pieces of data and efficiently reduce a load on rendering processing of point cloud data performed with animation software.

Although the preferred embodiment of the present disclosure has been described above, the present disclosure is not limited to the specific embodiment, and the present disclosure includes the invention described in the claims and their equivalents. Further, the configurations of the devices described in the above embodiment and modification can be appropriately combined as long as there is no technical inconsistency. Moreover, the program of the present invention may be expressed by a plurality of source codes, and the system 1 of the present invention may be realized by a plurality of hardware resources.

For example, the sewage equipment has been described as an example of a management object in the above-described embodiment, but the management object is not limited to such an aspect. The management object can be applied to various fields, such as water supply equipment, railroads, tunnels, roads, parks, airports, ports, rivers, dams, schools, electric power equipment, gas equipment, underground facilities, waste treatment facilities, and the like, as other existing infrastructure equipment, for example. Further, the system 1 may be employed not only for existing facilities but also for newly installed equipment.

<Supplementary Notes>

The followings are supplementary notes of the embodiment of the present invention.

(Supplementary Note 1)

An equipment management method in which a processor of a computer executes steps including:
  a first step (step S202) of receiving input of point cloud data that is acquired by measuring a space including a management object with a three-dimensional point cloud scanner 15;
  a second step (step S203) of selecting a plurality of pieces of point data, which are part of the point cloud data that is acquired, so as to determine point cloud data to be animated;
  a third step (step S204) of animating the point cloud data selected in the second step, so as to generate a management moving image in which the management object is represented as three-dimensional data in a virtual space; and
  a fourth step (step S205) of linking nameplate data 90, which is arranged by a user so as to overlap with the management object on the management moving image, to the management object represented on the management moving image.

(Supplementary Note 2)

An equipment management method in which a processor of a computer executes steps including:
  a first step (step S202) of receiving input of point cloud data that is acquired by measuring a space including a management object with a three-dimensional point cloud scanner 15;
  a second step (step S203) of selecting a plurality of pieces of point data, which are part of the point cloud data that is acquired, so as to determine point cloud data to be animated; and
  a third step (step S204) of animating the point cloud data selected in the second step, so as to generate a management moving image in which the management object is represented as three-dimensional data in a virtual space, in which processing is executed in which a plurality of pieces of point data that constitute a structure having a simple shape among structures captured together with the management object are converted into a three-dimensional model and a plurality of pieces of point data other than the pieces of point data in a portion converted into the three-dimensional model are selected so as to determine point cloud data to be animated.

(Supplementary Note 3)

The equipment management method according to (Supplementary note 1) or (Supplementary note 2), in which in the second step (step S203), processing for selecting part of the point cloud data, which is acquired, is executed by defining a positional interval between mutually-adjacent pieces of point data in the point cloud data.

(Supplementary Note 4)

The equipment management method according to (Supplementary note 1) or (Supplementary note 2), in which in the second step (step S203), processing for selecting part of the point cloud data, which is acquired, is executed by coarsening point cloud data located outside a predetermined range from a viewpoint of the management moving image.

(Supplementary Note 5)

The equipment management method according to (Supplementary note 1) or (Supplementary note 2), in which in the second step (step S203), processing for selecting part of the point cloud data, which is acquired, is executed so that the point cloud data has preset density in a process of changing a viewpoint of the management moving image.

(Supplementary Note 6)

The equipment management method according to (Supplementary note 1), in which management data to be used for management of the management object is linked to the nameplate data 90.

(Supplementary Note 7)

The equipment management method according to (Supplementary note 6), in which the management data is a management ledger for the management object.

(Supplementary Note 8)

The equipment management method according to (Supplementary note 6), in which the management data is data captured by a web camera, which captures a condition of the management object in real time.

(Supplementary Note 9)

The equipment management method according to (Supplementary note 6), in which the management data is a manual moving image obtained by capturing a work content of a maintenance and inspection work performed with respect to the management object and providing explanation of the work content.

(Supplementary Note 10)

The equipment management method according to (Supplementary note 1), in which processing for adjusting a display form of the nameplate data 90 is executed in the fourth step (step S205).

(Supplementary Note 11)

The equipment management method according to any one of (Supplementary note 1) to (Supplementary note 10), in which the management object is existing sewage equipment.

(Supplementary Note 12)

An equipment management device 10 including:

a data acquisition unit 21A that receives input of point cloud data that is acquired by measuring a space including a management object with a three-dimensional point cloud scanner 15;

a selection unit 21B that selects a plurality of pieces of point data, which are part of the point cloud data that is acquired, so as to determine point cloud data to be animated;

a moving image generation unit 21C that animates the point cloud data selected by the second means 21B, so as to generate a management moving image in which the management object is represented as three-dimensional data in a virtual space; and a moving image editing unit 21D that links nameplate data 90, which is arranged by a user so as to overlap with the management object on the management moving image, to the management object represented on the management moving image.

(Supplementary Note 13)

An equipment management device 10 including:

a data acquisition unit 21A that receives input of point cloud data that is acquired by measuring a space including a management object with a three-dimensional point cloud scanner 15;

a selection unit 21B that selects a plurality of pieces of point data, which are part of the point cloud data that is acquired, so as to determine point cloud data to be animated; and a moving image generation unit 21C that animates the point cloud data selected by the second means 21B, so as to generate a management moving image in which the management object is represented as three-dimensional data in a virtual space, in which the selection unit executes processing in which a plurality of pieces of point data that constitute a structure having a simple shape among structures captured together with the management object are converted into a three-dimensional model and a plurality of pieces of point data other than the pieces of point data in a portion converted into the three-dimensional model are selected so as to determine point cloud data to be animated.

An equipment management program that makes a computer execute the equipment management method according to any one of (Supplementary note 1) to (Supplementary note 11).

A recording medium that is readable by a computer and in which an equipment management program making a computer execute the equipment management method according to any one of (Supplementary note 1) to (Supplementary note 11) is recorded.

[Program and Recording Medium]

Figure 11:
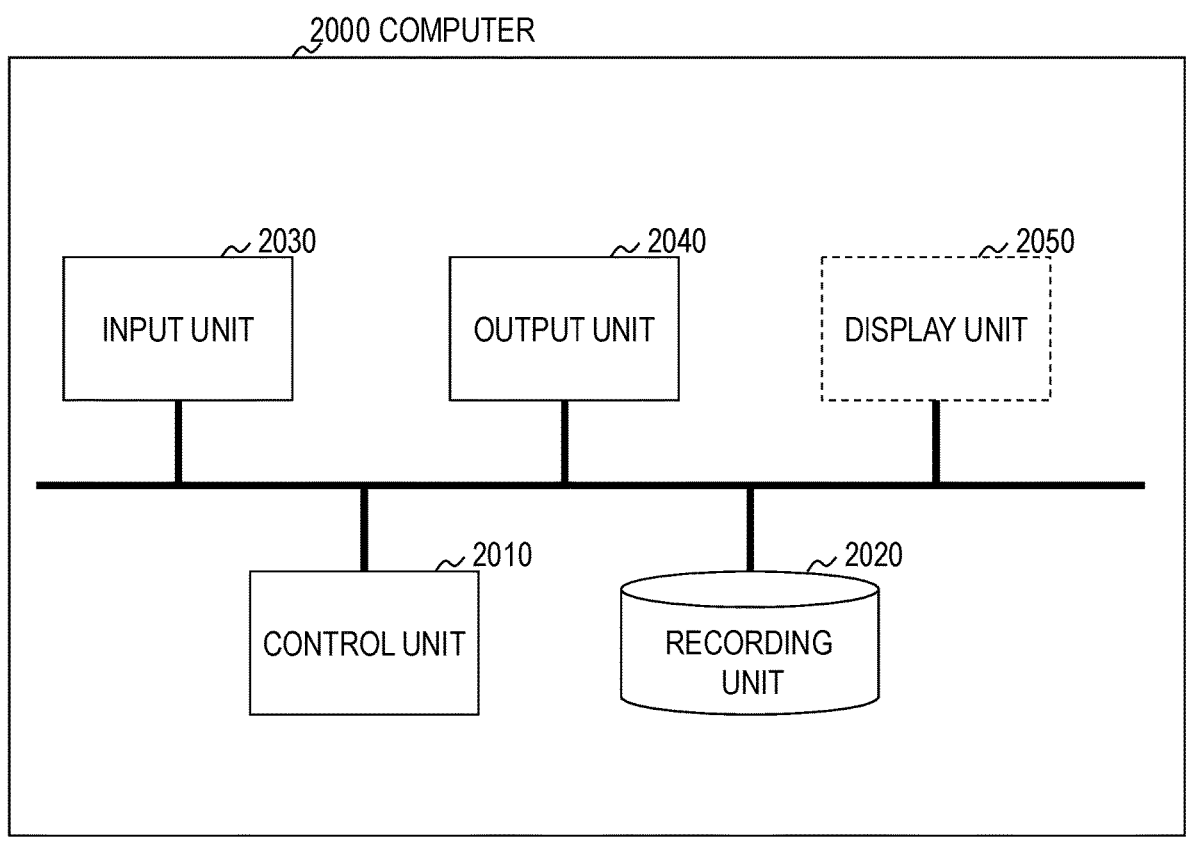
FIG. 11 is a diagram illustrating a functional configuration example of a computer.

The processing performed by the above-described equipment management device 10 can be performed by allowing a recording unit 2020 of a computer 2000 illustrated in FIG. 11 to read a program for execution of each step and allowing a control unit 2010, an input unit 2030, an output unit 2040, a display unit 2050, and the like to operate.

The program describing the processing details can be recorded on a computer-readable recording medium. The computer-readable recording medium may be any kind, such as a magnetic recording device, an optical disk, a magneto-optical recording medium, or a semiconductor memory.

Also, the distribution of this program is performed by, for example, selling, transferring, or lending a portable recording medium such as a DVD or a CD-ROM on which the program is recorded. Furthermore, a configuration may be adopted in which this program is distributed by storing the program in a storage device of a server computer and transferring the program to other computers from the server computer via a network.

The computer that executes such a program first, for example, temporarily stores the program recorded on the portable recording medium or the program transferred from the server computer in a storage device thereof. At the time of execution of processing, the computer then reads the program stored in the storage device thereof and executes the processing in accordance with the read program. Also, as another form of execution of this program, the computer may read the program directly from the portable recording medium and execute the processing in accordance with the program and, furthermore, every time the program is transferred to the computer from the server computer, the computer may sequentially execute the processing in accordance with the received program. Also, a configuration may be adopted in which the transfer of a program to the computer from the server computer is not performed and the above-described processing is executed by so-called application service provider (ASP)-type service by which the processing functions are implemented only by an instruction for execution thereof and result acquisition. Note that a program in this form shall encompass information that is used in processing by an electronic computer and acts like a program (such as data that is not a direct command to a computer but has properties prescribing computer processing).

Further, although the present device was described as being configured via execution of a predetermined program on a computer in this form, at least some of these processing details may instead be embodied with hardware.

DESCRIPTION OF REFERENCE NUMERALS 1 management system
10 equipment management device
20 control device
60 server
100 network

What is claimed is:

1. An equipment management method in which a processor of a computer executes, the equipment management method comprising:
receiving input of point cloud data that is acquired by measuring a space including a management object with a three-dimensional point cloud scanner;
selecting a plurality of pieces of point data, the plurality of pieces of point data being part of the point cloud data that is acquired, so as to determine point cloud data to be animated;
animating the point cloud data, the point cloud data being composed of the plurality of pieces of point data that are selected, so as to generate a management moving image in which the management object is represented as three-dimensional data in a three-dimensional virtual space; and
linking nameplate data, the nameplate data being arranged by a user and fixed on a coordinate position in the three-dimensional virtual space so as to overlap with the management object on the management moving image, to the management object represented on the management moving image, wherein
in the management moving image, an image of the point cloud data is changed in response to a viewpoint moving operation performed by the user, and
an orientation of the nameplate data is set so that the nameplate data faces in a direction from the coordinate position toward the viewpoint.

2. The equipment management method according to claim 1, wherein
in the selecting the plurality of pieces of point data so as to determine point cloud data to be animated,
processing for selecting part of the point cloud data, the point cloud data being acquired, is executed by defining a positional interval between mutually-adjacent pieces of point data in the point cloud data.

3. The equipment management method according to claim 1, wherein
in the selecting the plurality of pieces of point data so as to determine point cloud data to be animated,
processing for selecting part of the point cloud data, the point cloud data being acquired, is executed by coarsening point cloud data located outside a predetermined range from a viewpoint of the management moving image.

4. The equipment management method according to claim 1, wherein
in the selecting the plurality of pieces of point data so as to determine point cloud data to be animated,
processing for selecting part of the point cloud data, the point cloud data being acquired, is executed so that the point cloud data has preset density in a process of changing a viewpoint of the management moving image.

5. The equipment management method according to claim 1, wherein
management data to be used for management of the management object is linked to the nameplate data.

6. The equipment management method according to claim 5, wherein
the management data is a management ledger for the management object.

7. The equipment management method according to claim 5, wherein
the management data is data captured by a web camera, the web camera capturing a condition of the management object in real time.

8. The equipment management method according to claim 5, wherein
the management data is a manual moving image obtained by capturing a work content of a maintenance and inspection work performed with respect to the management object and providing explanation of the work content.

9. The equipment management method according to claim 1, wherein
processing for adjusting a display form of the nameplate data is executed in the linking the nameplate data so as to overlap with the management object on the management moving image.

10. An equipment management device comprising:
a data acquisition processor that receives input of point cloud data that is acquired by measuring a space including a management object with a three-dimensional point cloud scanner;
a selection processor that selects a plurality of pieces of point data, the plurality of pieces of point data being part of the point cloud data that is acquired, so as to determine point cloud data to be animated;
a moving image generation processor that animates the point cloud data, the point cloud data being composed of the plurality of pieces of point data that are selected by the selection processor, so as to generate a management moving image in which the management object is represented as three-dimensional data in a three-dimensional virtual space; and a moving image editing processor that links nameplate data, the nameplate data being arranged by a user and fixed on a coordinate position in the three-dimensional virtual space so as to overlap with the management object on the management moving image, to the management object represented on the management moving image, wherein in the management moving image, an image of the point cloud data is changed in response to a viewpoint moving operation performed by the user, and an orientation of the nameplate data is set so that the nameplate data faces in a direction from the coordinate position toward the viewpoint.

11. A non-transitory computer-readable recording medium in which an equipment management program making a computer execute the equipment management method according to claim 1 is recorded.

12. The equipment management method according to claim 1, wherein in the linking the nameplate data so as to overlap with the management object on the management moving image, the name plate being arranged by the user includes selecting and clicking point data constituting the management object, and the linking of the nameplate data includes making the coordinate information of point data, which is located at the closest position from the viewpoint of the management moving image at the time of the clicking into the coordinate information of the nameplate data.

13. An equipment management method in which a processor of a computer executes, the equipment management method comprising:

receiving input of point cloud data that is acquired by measuring a space including a management object with a three-dimensional point cloud scanner;

selecting a plurality of pieces of point data, the plurality of pieces of point data being part of the point cloud data that is acquired, so as to determine point cloud data to be animated;

animating the point cloud data, the point cloud data being composed of the plurality of pieces of point data that are selected, so as to generate a management moving image in which the management object is represented as three-dimensional data in a three-dimensional virtual space; and attaching nameplate data which identify management objects to the management object in a moving image and fixing the nameplate on a coordinate position in the three-dimensional virtual space, wherein in the management moving image, an image of the point cloud data is changed in response to a viewpoint moving operation performed by the user, and an orientation of the nameplate data is set so that the nameplate data faces in a direction from the coordinate position toward the viewpoint.

14. The equipment management method according to claim 13, wherein the coordinate position of the nameplate data is set on the basis of point data constituting the management object.

15. The equipment management method according to claim 13, wherein the nameplate data is fixed on the coordinate position, which is indicated by coordinate information included in corresponding point data constituting the management object, in the three-dimensional virtual space.

16. The equipment management device according to claim 10, wherein in the moving image editing processor linking the nameplate data so as to overlap with the management object on the management moving image, the nameplate data being arranged by the user includes selecting and clicking point data constituting the management object, and the linking of the nameplate data includes making the coordinate information of point data, which is located at the closest position from the viewpoint of the management moving image at the time of the clicking into the coordinate information of the nameplate data.

17. An equipment management device comprising:

a data acquisition processor that receives input of point cloud data that is acquired by measuring a space including a management object with a three-dimensional point cloud scanner;

a selection processor that selects a plurality of pieces of point data, the plurality of pieces of point data being part of the point cloud data that is acquired, so as to determine point cloud data to be animated;

a moving image generation processor that animates the point cloud data, the point cloud data being composed of the plurality of pieces of point data that are selected by the selection processor, so as to generate a management moving image in which the management object is represented as three-dimensional data in a three-dimensional virtual space; and a moving image editing processor that attaches nameplate data which identify management objects to the management object in a moving image and fixes the nameplate on a coordinate position in the three-dimensional virtual space, wherein in the management moving image, an image of the point cloud data is changed in response to a viewpoint moving operation performed by the user, and an orientation of the nameplate data is set so that the nameplate data faces in a direction from the coordinate position toward the viewpoint.

18. The equipment management device according to claim 17, wherein the position of the nameplate data is set on the basis of point data constituting the management object.

19. The equipment management device according to claim 17, wherein the nameplate data is fixed on the coordinate position, which is indicated by coordinate information included in corresponding point data constituting the management object, in the three-dimensional virtual space.

20. A non-transitory computer-readable recording medium in which an equipment management program making a computer execute the equipment management method according to claim 13 is recorded.

* * * * *